(12) United States Patent
Watfa et al.

(10) Patent No.: US 7,773,628 B2
(45) Date of Patent: Aug. 10, 2010

(54) METHODS AND APPARATUS FOR MEDIA INDEPENDENT MESSAGING OVER THE INTERNET

(75) Inventors: Mahmoud Watfa, Montreal (CA); Shamim Akbar Rahman, Montreal (CA); Ulises Olvera-Hernandez, Kirkland (CA)

(73) Assignee: InterDigital Technology Corporation, Wilmington, DE (US)

( * ) Notice: Subject to any disclaimer, the term of this patent is extended or adjusted under 35 U.S.C. 154(b) by 369 days.

(21) Appl. No.: 11/750,055

(22) Filed: May 17, 2007

(65) Prior Publication Data
US 2007/0291792 A1    Dec. 20, 2007

Related U.S. Application Data

(60) Provisional application No. 60/801,786, filed on May 19, 2006.

(51) Int. Cl.
*H04J 3/16* (2006.01)

(52) U.S. Cl. .................. 370/469; 370/464; 370/465

(58) Field of Classification Search .......... 370/469, 370/331, 389, 464, 465
See application file for complete search history.

(56) References Cited

U.S. PATENT DOCUMENTS

| 6,393,023 | B1 | 5/2002 | Shimizu et al. | |
|---|---|---|---|---|
| 2006/0099948 | A1* | 5/2006 | Hoghooghi et al. | 455/436 |
| 2006/0221899 | A1* | 10/2006 | Feder et al. | 370/331 |
| 2006/0230151 | A1* | 10/2006 | Kim et al. | 709/226 |
| 2006/0265474 | A1* | 11/2006 | Kim et al. | 709/218 |
| 2006/0268802 | A1* | 11/2006 | Faccin | 370/338 |
| 2006/0277298 | A1* | 12/2006 | Kim et al. | 709/224 |
| 2007/0072611 | A1* | 3/2007 | Feder et al. | 455/436 |

FOREIGN PATENT DOCUMENTS

WO    2006/052563    5/2006

OTHER PUBLICATIONS

IEEE, *IEEE P802.21/D00.05 Draft IEEE Standard for Local and Metropolitan Area Networks: Media Independent Handover Services*, IEEE P802.21/D00.05, (Jan. 2006).
IEEE, *IEEE P802.21/D01.09 Draft IEEE Standard for Local and Metropolitan Area Networks: Media Independent Handover Services*, IEEE P802.21/D01.09, (Sep. 2006).
IEEE, *IEEE P802.21/D00.05 Draft IEEE Standard for Local and Metropolitan Area Networks: Media Independent Handover Services*, IEEE P802.21/D00.05, (Jan. 2006).
IEEE, *IEEE P802.21/D01.09 Draft IEEE Standard for Local and Metropolitan Area Networks: Media Independent Handover Services*, IEEE P802.21/D01.09, (Sep. 2006).

* cited by examiner

*Primary Examiner*—Chi H Pham
*Assistant Examiner*—Robert Lopata
(74) *Attorney, Agent, or Firm*—Volpe and Koenig, P.C.

(57) ABSTRACT

A method and device for performing media independent handover (MIH) in a wireless communication system. The method includes, and the apparatus is configured to, generate a higher layer handover message, send the higher layer handover message encapsulated in a lower level formatted communication, set a higher layer timing device for a timeout period in connection with the sending of the encapsulated higher layer handover message, and resend the higher layer handover message encapsulated in a lower level formatted communication unless a higher layer acknowledgement is received before expiration of the timeout period.

22 Claims, 12 Drawing Sheets

METHODS AND APPARATUS FOR MEDIA INDEPENDENT MESSAGING OVER THE INTERNET

CROSS REFERENCE TO RELATED APPLICATION

This application claims the benefit of U.S. provisional application No. 60/801,786, filed May 19, 2006, which is incorporated by reference as if fully set forth.

FIELD OF INVENTION

The present invention relates to wireless communication systems. In particular, the present invention relates to methods and apparatus for media independent messaging over the internet such as utilizing transport of IEEE 802.21 compliant media independent handover messages over internet protocol (IP).

BACKGROUND

The IEEE 802.21 standards group is developing a framework to enable the exchange of support messages such as 802.21 compliant information, events, and commands between network and mobile nodes to achieve seamless handover. For example, a network node, referred to as an 802.21 server, can send an information element to a mobile node that contains a list of network operators from which a mobile node can choose its target network for handover. However, the IEEE 802.21 standard does not specify the means of transporting such information over Internet Protocol (IP).

Some 802.21 compliant messages carry time sensitive data. Accordingly, these messages should be delivered as quickly as possible so as to achieve the fastest attainable handover. The inventors have recognized that User Datagram Protocol over Internet Protocol (UDP/IP) may be a suitable transport mechanism because it is has low latency in delivering a message. However, there are several signaling and internetworking problems that require resolution in order to use UDP/IP to deliver 802.21 compliant messages.

SUMMARY

A method and apparatus for the exchange of media independent handover (MIH) messages in a wireless network preferably using reliable User Datagram Protocol over Internet Protocol (UDP/IP). A timing device is preferably used to provide time limits in which acknowledgments are to be received by a transmitting node on the network. If no acknowledgment is received, the MIH message is retransmitted. Preferably a hierarchy of timeout periods is employed. The length of the timer is preferably based on the type of handover message.

Handovers are preferably controlled by a server or a wireless transmit/receive unit (WTRU). A WTRU and a server are preferably configured to communicate directly or through a proxy. The WTRU may be configured to transmit UDP/IP messages or may be configured to transmit via Layer 2 (L2) messaging. L2 messages are preferably converted in the proxy into UDP/IP messages before the messages are forwarded to the server.

BRIEF DESCRIPTION OF THE DRAWINGS

A more detailed understanding of the invention may be had from the following description of a preferred embodiment, given by way of example and to be understood in conjunction with the accompanying drawing(s) wherein:

FIG. 8b is a continuation of the signaling diagram of FIG. 8a; and

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
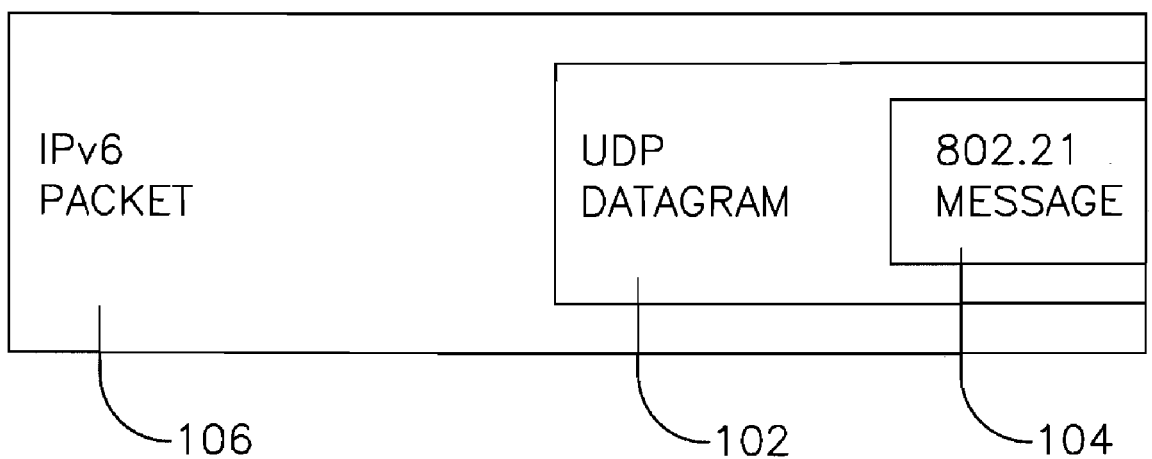
FIG. 1 is a representative illustration of an IP packet including a UDP datagram and an 802.21 message in accordance with one embodiment of the present invention.

FIG. 1 illustrates a preferred structure of an IP packet including a UDP datagram and an 802.21 message in accordance with one embodiment of the present invention. Preferably, an UDP datagram 102 contains an 802.21 message 104 and is encapsulated in an IPv6 packet 106. The internal details of the 802.21 message frame are preferably as defined in IEEE 802.21.

Figure 2:
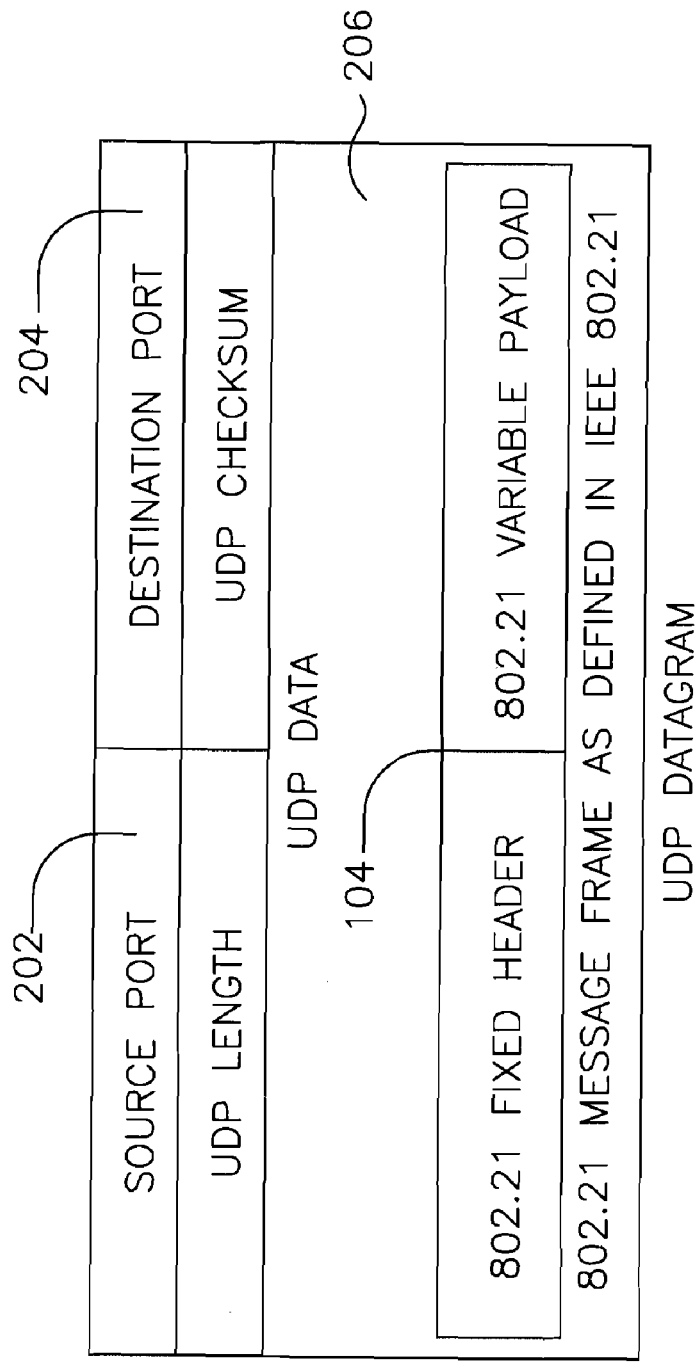
FIG. 2 is a representative illustration of a UDP datagram containing an 802.21 message in accordance with one embodiment of the present invention.

FIG. 2 further illustrates the preferred structure of a UDP datagram 102 containing an 802.21 message 104 within a UDP data field 206. UDP datagram header fields such as a source port field 202 and a destination port field 204 are provided for port numbers of source and destination application layers, respectively. The application layer is preferably an 802.21 compliant application. New port numbers are preferably defined for the 802.21 applications so that the transport layer can direct 802.21 messages to the intended applications.

The 802.21 message 104 itself preferably includes a fixed header and a variable payload.

Figure 3:
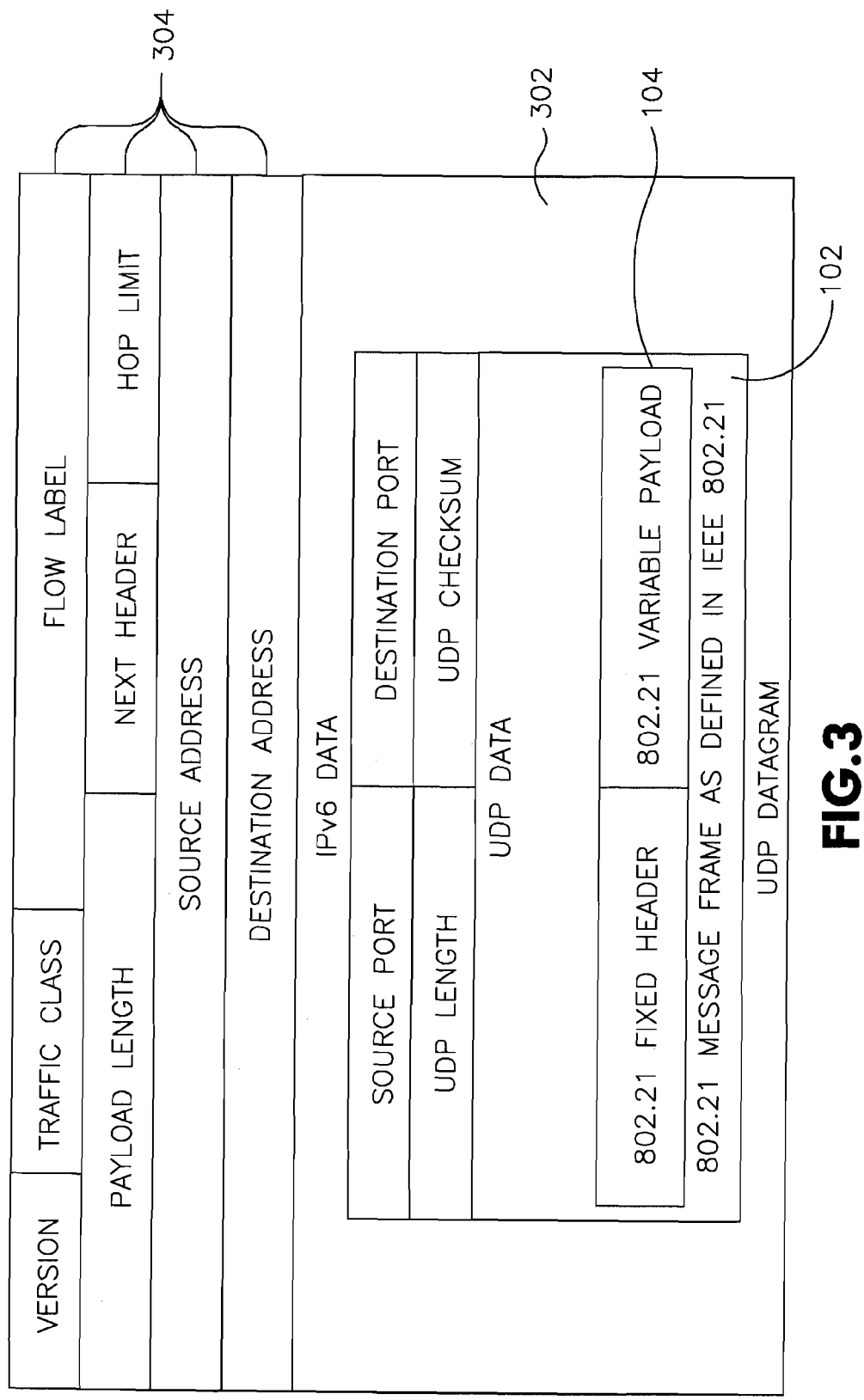
FIG. 3 is a representative illustration of an IP Packet in accordance with one embodiment of the present invention.

FIG. 3 further illustrates the preferred structure of the IP Packet 106 as having an IPv6 data field 302 and IPv6 packet headers 304. The UDP datagram 102 contains the 802.21 message 104 that resides in the IPv6 data field 302. No changes are necessary to the conventional IPv6 packet headers 304 for support of 802.21 message transport.

Figure 4:
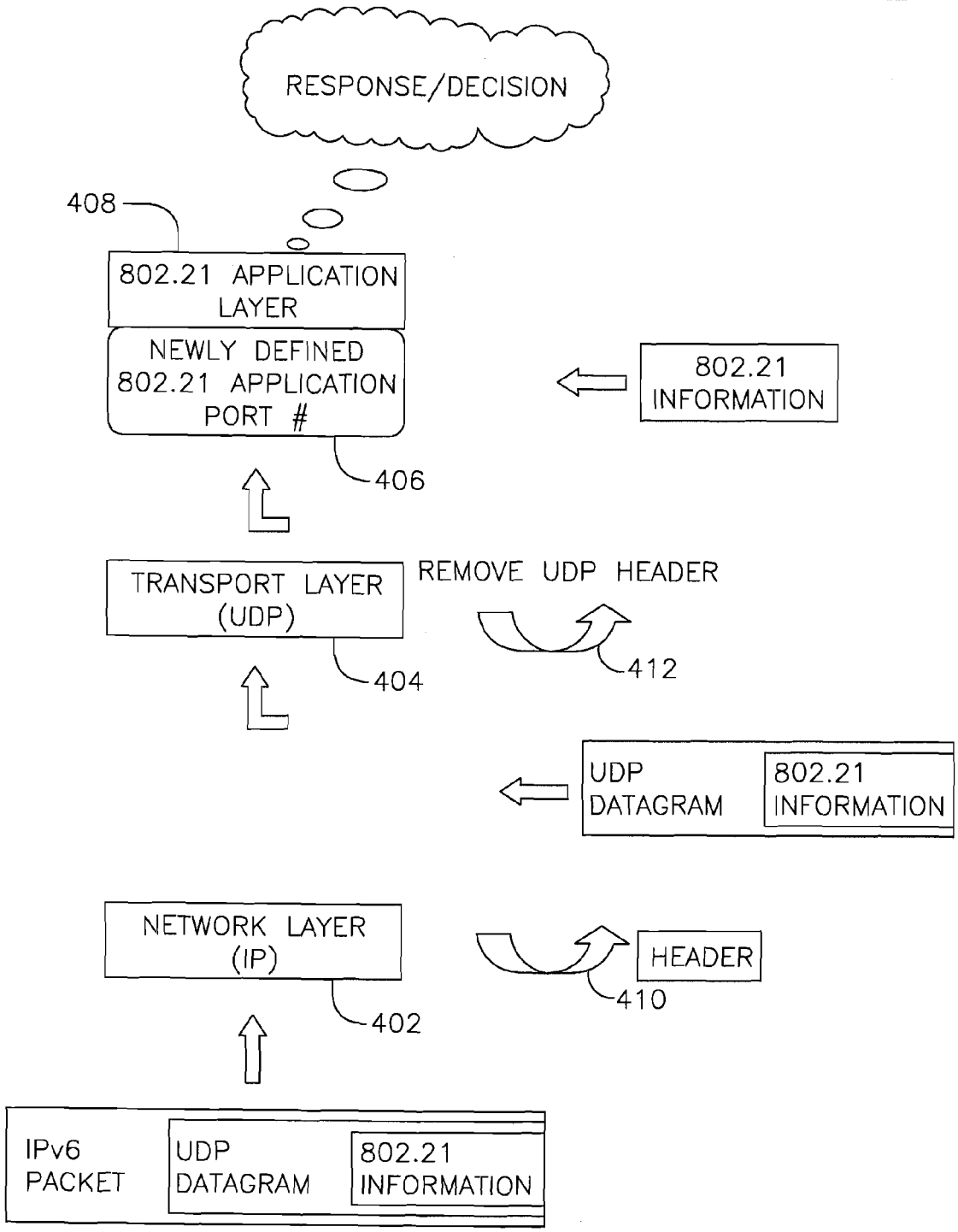
FIG. 4 is a flow diagram of an IP packet processing method in accordance with one embodiment of the present invention.

FIG. 4 is a flow diagram of an IP packet processing method in accordance with one embodiment of the present invention. The processing preferably starts at a network IP layer and assumes that all the lower layers are working. At step 402, the network layer receives an IPv6 packet, such as packet 106 of FIG. 3, from a lower layer and at step 410 strips off the IPv6 header 304. The network layer processes the data portion 302 of the packet 106 and forwards the UDP datagram 102 contained in the packet data 302 to the appropriate transport protocol (UDP) based on the IPv6 header 304. At step 404, the transport layer (UDP) receives the UDP datagram 102. Its headers, such as the source and destination header fields 202 and 204 are removed at step 412 and processed. At step 406, the UDP protocol forwards the contents of the data field 206 of the UDP datagram 102 to the appropriate application layer per the UDP datagram header fields. The appropriate application layer is determined by the value of a destination port number. The 802.21 application preferably has a newly defined port number, and therefore the 802.21 message 104 is forwarded to the 802.21 application at such newly defined port number. At step 408, the 802.21 application decodes the 802.21 message 104 according to the IEEE 802.21 specifications and reacts as required.

Figure 5:
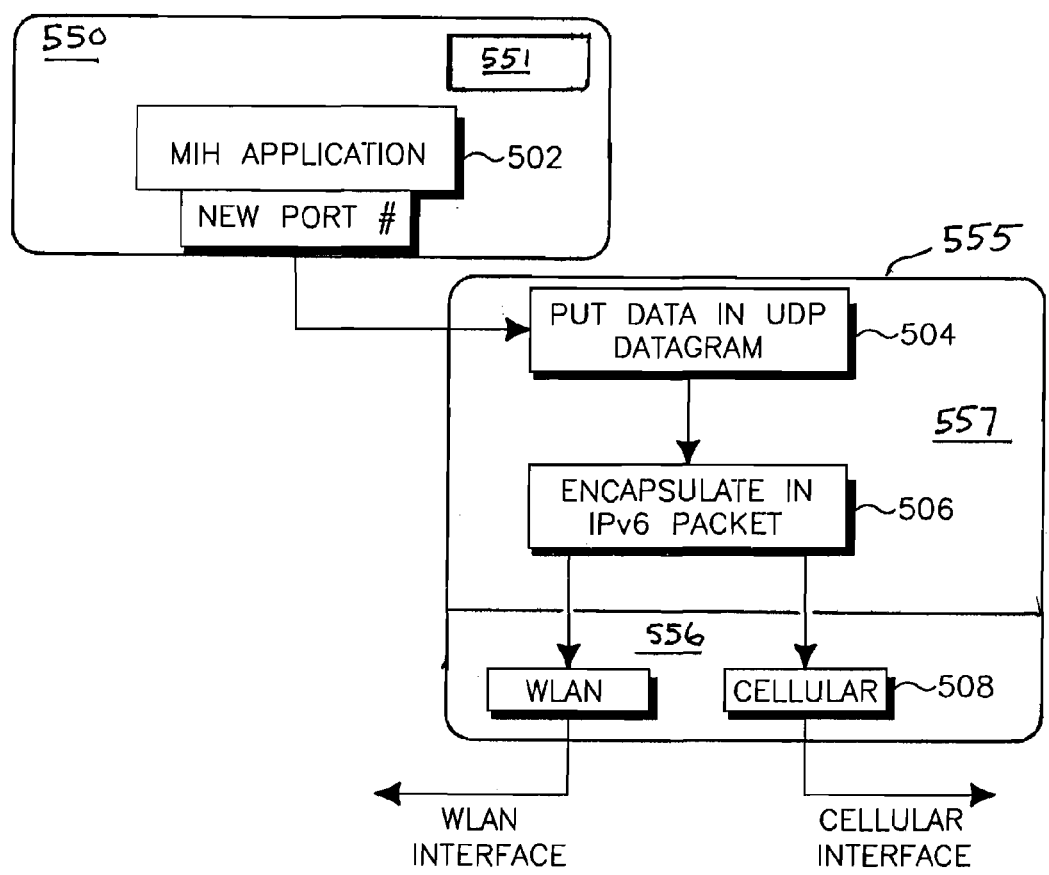
FIG. 5 is a flow diagram of an 802.21 data packet processing method in accordance with one embodiment of the present invention.

The steps taken by a client device to transmit an 802.21 message are preferably inversely symmetric to the steps explained above. FIG. 5 is a flow diagram of a preferred 802.21 data packet processing method in accordance with one embodiment of the present invention. At step 502, the 802.21 application generates an 802.21 message, preferably as specified in IEEE 802.21, such as 802.21 message 104, and passes it to a transport Layer (UDP) through a newly defined port. At step 504, the UDP encapsulates the data in a UDP datagram, such as datagram 102, and sets the header fields accordingly. For example, the 802.21 message 104 becomes part of the UDP data field 206 of the UDP datagram 102 with the source port field 202 containing the identification of the newly defined port of the 802.21 application.

At step 506, the datagram is sent to the network layer where it is in turn encapsulated in an IPv6 packet and all the header fields of the packet are set accordingly. For example, the UDP datagram 102 becomes part of the IPv6 packet data field 302 of the IP Packet 106, preferably with the source address header field 305 containing some type of identification of the newly defined port of the 802.21 application.

At step 508, the packet is sent to the lower layers for transmission to the network. A network node such as an 802.21 server preferably follows a similar process.

Even though UDP does provide relatively reliable transport, reliability is preferably implemented at the application layer, in this case the 802.21 application, by an interaction between the sender and the receiver of an 802.21 message. The sender of a message preferably indicates that an acknowledge (ACK) message should be returned by the receiver. This is preferably accomplished by setting an ACK Request bit internally in the 802.21 message frame. The details of such a field and other fields of a preferred 802.21 message frame are specified in IEEE 802.21. An application timer is preferably provided and set for a selected timeout period in connection with the transmission of the 802.21 message. If an ACK message arrives to the sender before the application timer expires, then the message was delivered correctly to the receiver. If an ACK does not arrive within the timeout period then the sender will retransmit and reset the timer. This process is repeated until an ACK is received in response to a retransmission of the message. However, if a selected number of retransmissions occurs without receiving an ACK, a transmission failure is preferably reported back to the sending 802.21 application in lieu of endlessly retransmitting the message.

Referring again to FIG. 5, in the hardware context, a WTRU, server or other type of communication node preferably includes lower layer components 555 that include physical layer (L1) components 556 which transmits or otherwise sends the communication signals from the hardware and layer 2 (L2) components 557 that provide an appropriate formatting of the communications being sent by the physical layer dependent on the type of communication interface. The communications hardware is preferably configured with a higher layer component 550, such as an 802.21 application component discussed in detail herein, for controlling events such as the handover of a communication from one type of physical interface to another. Such higher layer component 550 is preferably equipped with a timing device 551 to provide enhanced messaging reliability that is independent of the lower layer communication processing.

A receiving 802.21 application, upon receipt of an 802.21 message, preferably sends a UDP ACK to acknowledge the receipt of the 802.21 message. This is preferably done by setting an ACK Respond bit of the 802.21 message frame as specified in IEEE 802.21 and inserting it into a UDP datagram as discussed above with respect to FIG. 5.

An optional UDP checksum field, as shown in FIG. 2, for example, of UDP datagram 102, can be used to check for errors in the message carrying UDP datagram. If used, and a checksum is found to be in error, the UDP will not forward the UDP datagram data to the application layer. In such case, a receiving 802.21 application will not receive an encapsulated 802.21 message to acknowledge or a sending 802.21 application will not receive an ACK message. Thus where the UDP checksum fails, the sending 802.21 application will retransmit the 802.21 message after the timeout period expires.

The contents of certain 802.21 messages are more sensitive to delay than others. Accordingly, the values of timeout periods are preferably different for the different 802.21 message types. For example, messages that contain non-time sensitive information, such as a list of neighboring network operators, can be sent periodically to update mobile nodes and preferably have the longest timeout period.

By way of another example, in a time sensitive application, such as in a network controlled handover, the network 802.21 server can issue a command to a mobile node to handover to a target operator. Since the server manages the available network resources, such a message is preferred to arrive as fast as possible. Thus, the timeout period associated with command messages is preferably shorter than those of messages with information.

Preferably, an 802.21 application timer is provided that is configurable with at least three timeout periods such that the timeout period used preferably depends on the type of 802.21 messages being sent. Optionally, multiple timers may be used, each configured with a set timeout period, or a combination of multiple timers having multiple configurable timeout periods to meet a user preference. For example, three timers may be provided to be used respectively with the three type of messages indicated in Table 1 below. In lieu of a fixed timeout period, the respective timers may each have a default timeout period, which may be adjustable by a user of the 802.21 application or automatically based upon network conditions or other factors.

One timeout period is preferably an information timeout period that is set in connection with the transmission of a message that is related to information elements. A second timeout period is preferably an event timeout period that is preferably set in connection with the transmission of a message that is related to events. A third timeout period is preferably a command timeout period that is preferably set in connection with the transmission of a message that is related to commands. Table 1 contains examples of preferred maximum timeout period values associated with the various types of messages.

TABLE 1

Preferred Maximum Timeout Period Values for 802.21 Messages Sent Over UDP/IP

| Message Content | Timeout Period Type | Example Value (Seconds) | Preferred Relationships |
|---|---|---|---|
| 802.21 Information | Information Timer - $\tau 1$ | 6 | $\tau 1 > \tau 2$ Least time sensitive |
| 802.21 Event | Event Timer - $\tau 2$ | 4 | $\tau 3 < \tau 2 < \tau 1$ |
| 802.21 Command | Command Timer - $\tau 3$ | 2 | $\tau 3 < \tau 2$ Most time sensitive |

Figure 6A:
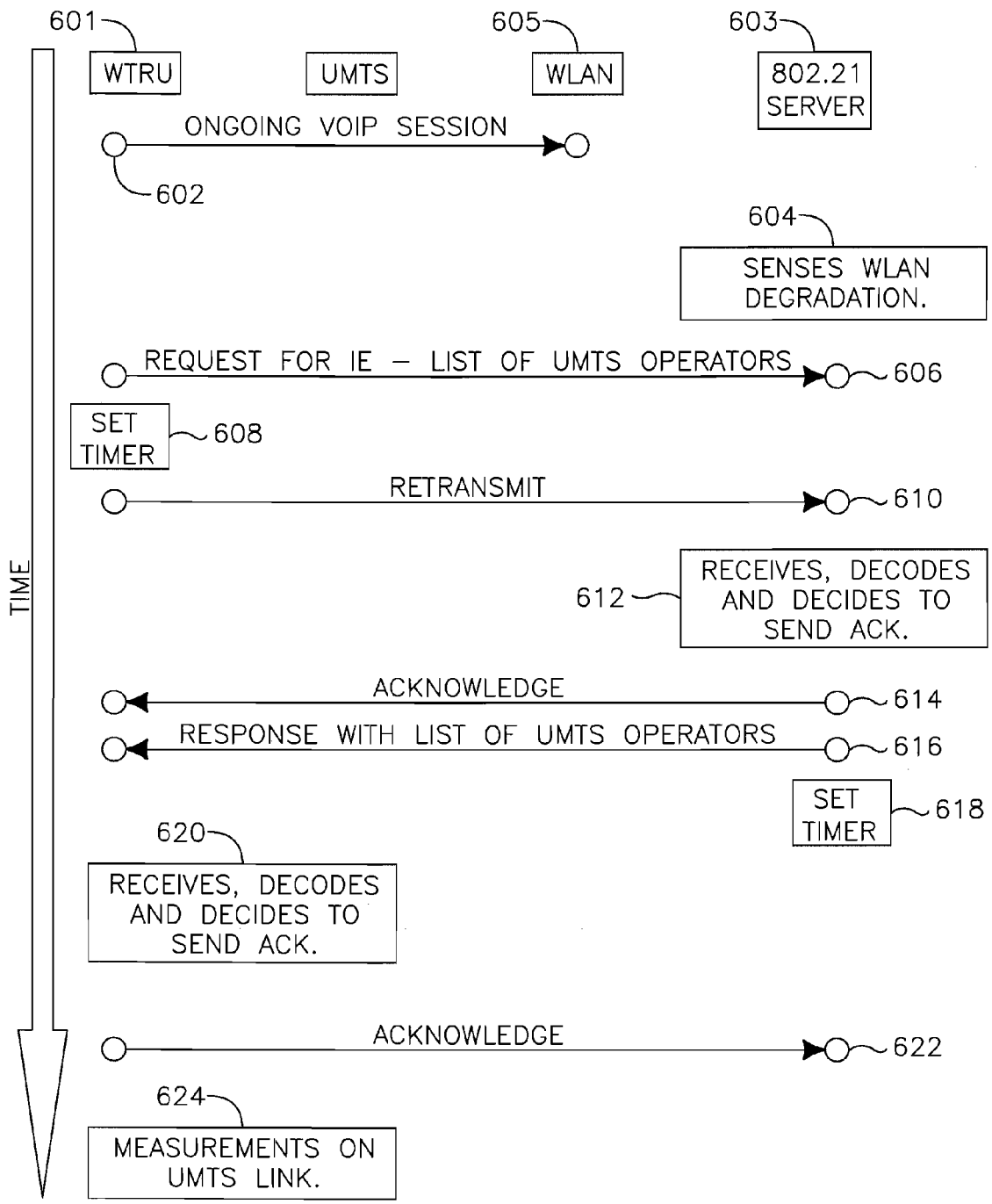
FIG. 6a is a signal diagram for a method of signaling between a wireless transmit/receive unit (WTRU) and an 802.21 server in accordance with one embodiment of the present invention.

FIG. 6a is an example signal diagram depicting signaling between a WTRU 601 incorporating an 802.21 application and an 802.21 server 603 that both are equipped with timer devices in accordance with one embodiment of the present invention. As shown in FIG. 6a, the WTRU 601 is initially connected via a WLAN link to a WLAN 605 to conduct, for example, an ongoing voice-over-IP (VoIP) session 602. The WLAN 605 in this case is not processing messages from a party, but is preferably routing IP packets to their destination. UDP is preferably being used as the transport protocol for all IP based messages.

At step 604, the 802.21 application of WTRU 601 which preferably has an intelligent engine, detects degradation on the WLAN link. At step 606, the 802.21 application of WTRU 601 sends a message to 802.21 server 603 containing a request for information element and a list of neighboring operators for a Universal Mobile Telecommunications System (UMTS) link. At step 608, the 802.21 application of WTRU 601 also sets an information timer in connection with sending the message of step 606. Since the message contained a request for information, the timer is preferably set with a timeout period of $\tau_1$ seconds.

In the example, the 802.21 application of WTRU 601 does not receive an ACK within the timeout period, and therefore, at step 610, the 802.21 application of WTRU 601 retransmits the request and resets its information timer. At step 612 the 802.21 server 603 receives the message, decodes it, and decides to send an ACK message. At step 614 the 802.21 server 603 transmits its ACK message to the WTRU 601. The ACK message arrives before the information timer at the WTRU 601 expires so the 802.21 application of WTRU 601 does not further retransmit the request.

At step 616, the 802.21 server 603 sends a response message to the WTRU 601 containing the list of neighboring UMTS operators. At step 618, the 802.21 server 603 sets its information timer. At step 620, the 802.21 application of WTRU 601 receives the response message, decodes it and decides to send an ACK. At step 622, the 802.21 application of WTRU 601 sends an ACK to the 802.21 server 603. The ACK arrives before the timeout period of the information timer at the server 603 expires. At step 624 the WTRU 601 performs measurements on its UMTS link and a determination to handover the ongoing voice-over-IP (VoIP) session is made.

At this point, there are a number of actions that may be performed. One set of actions may be taken if, for example, the network controls the handover process. A different set of actions may occur if the handover is controlled by the WTRU 601.

Figure 6B:
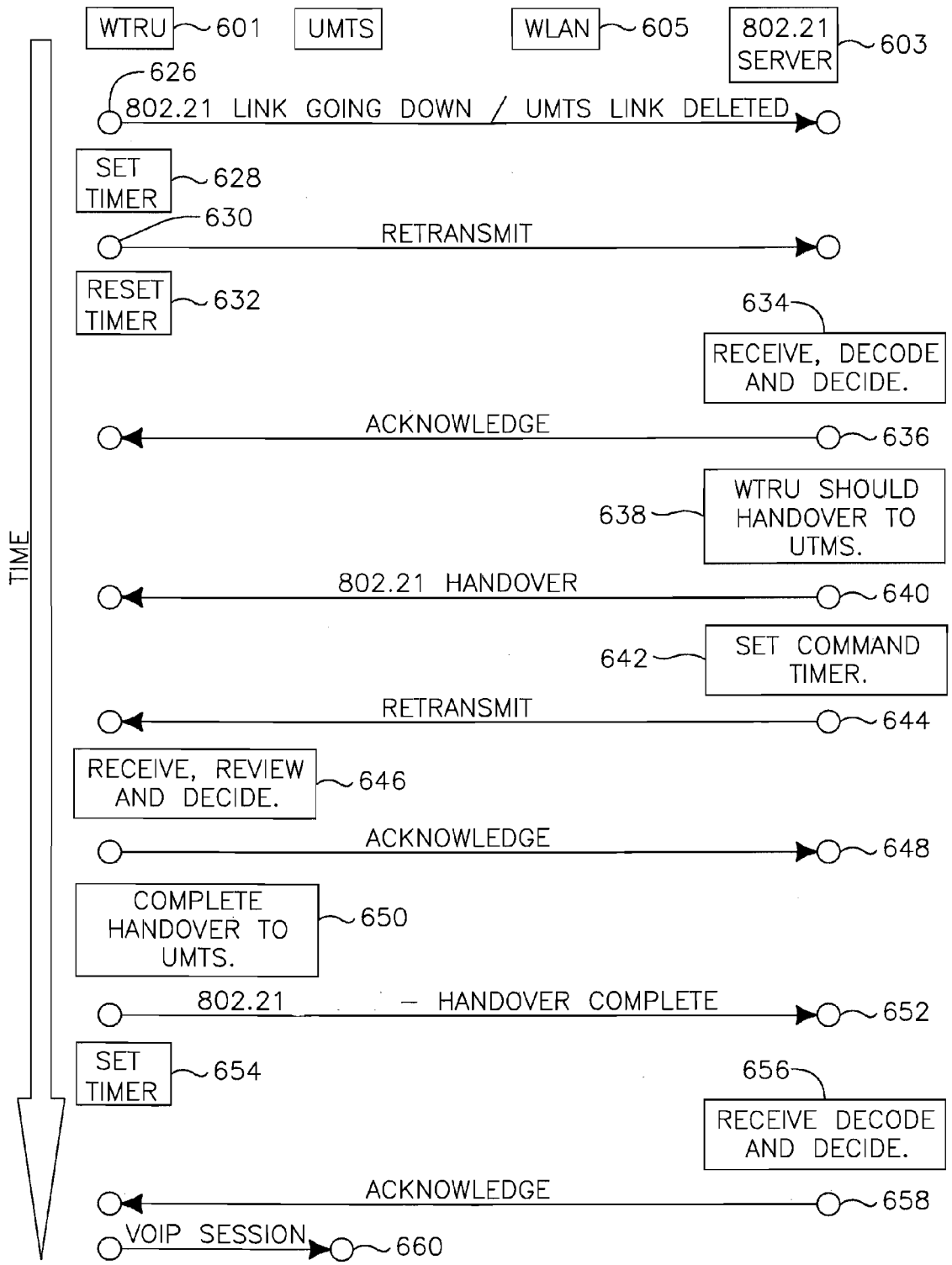
FIG. 6b is a continuation of the signal diagram of FIG. 6a for a method of network controlled handover in accordance with one embodiment of the present invention.

FIG. 6b is a continuation of the example shown in FIG. 6 for a network controlled handover. At step 626, the WTRU 601 informs the 802.21 server 603 that its WLAN link is degrading and that it has detected a UMTS link by sending an 802.21 "link going down" event and "UMTS link detected" event. At step 628, the 802.21 application of WTRU 601 sets its event timer in connection with sending the event message. In the example, the WTRU's event timer expires after timeout period of preferably $\tau_2$ seconds, during which it does not receive an ACK from the 802.21 server 603. Therefore, at step 630, the 802.21 application of WTRU 601 retransmits the event message and in connection therewith, at step 632, resets its event timer.

At step 634, the 802.21 server 603 receives the message, decodes it and decides about its next actions to be taken. At step 636, the 802.21 server 603 sends an ACK message to the WTRU 601 which receives it before the WTRU's event timer expires. At step 638, the 802.21 server 603 performs some internal actions and decides that the WTRU 601 should handover to a UMTS operator. At step 638, the 802.21 server 603 sends an 802.21 MIH message that commands a handover to a UMTS network, to the WTRU 601. At step 642, the 802.21 server 603 sets its command timer preferably with a timeout period of $\tau_3$ seconds.

In the example, the 802.21 server 603 does not receive a timely ACK and the server's command timer expires after $\tau_3$ seconds. Therefore, at step 644, the 802.21 server 603 retransmits the 802.21 command and resets its command timer. At step 646, the WTRU 601 receives the command messages and decides on its next actions. At step 648, the WTRU 601 sends an ACK which arrives before the server's command timer expires.

At step 650, the WTRU 601 takes the necessary handover actions and completes the handover process to a UMTS link. At step 652, the 802.21 application of WTRU 601 sends an 802.21 event to the 802.21 server 603 to inform about completion of the handover process and in connection therewith, at step 654, sets its event timer and waits for an ACK message.

At step 656, the 802.21 server 603 receives the event message, decodes it and decides what should be done next. At step 658, the 802.21 server 603 sends an ACK message to the WTRU 601 that arrives before the WTRU's event timer expires. At step 660, the VoIP session continues seamlessly over the UMTS link.

Figure 6C:
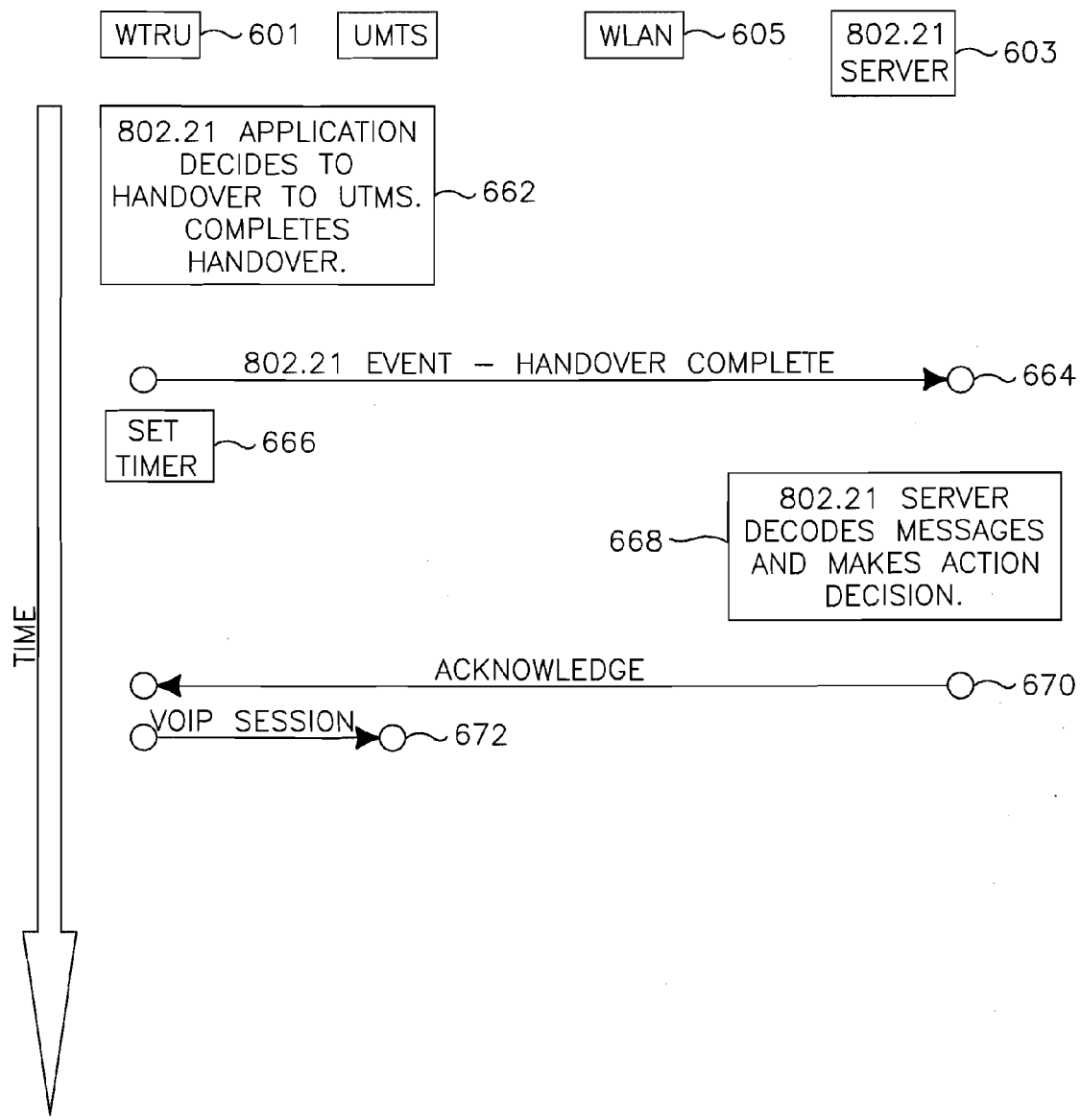
FIG. 6c is a second continuation of the signal diagram of FIG. 6a for a method of WTRU controlled handover in accordance with another embodiment of the present invention.

FIG. 6c is a continuation of the method shown in FIG. 6a where the WTRU 601 controls the handover. At step 662, the 802.21 application of the WTRU 601 decides to handover the VoIP session to UMTS link based on the previous actions detailed with respect to FIG. 6a. The WTRU 601 then takes the necessary steps for handover and completes the handover process.

Figure 7:
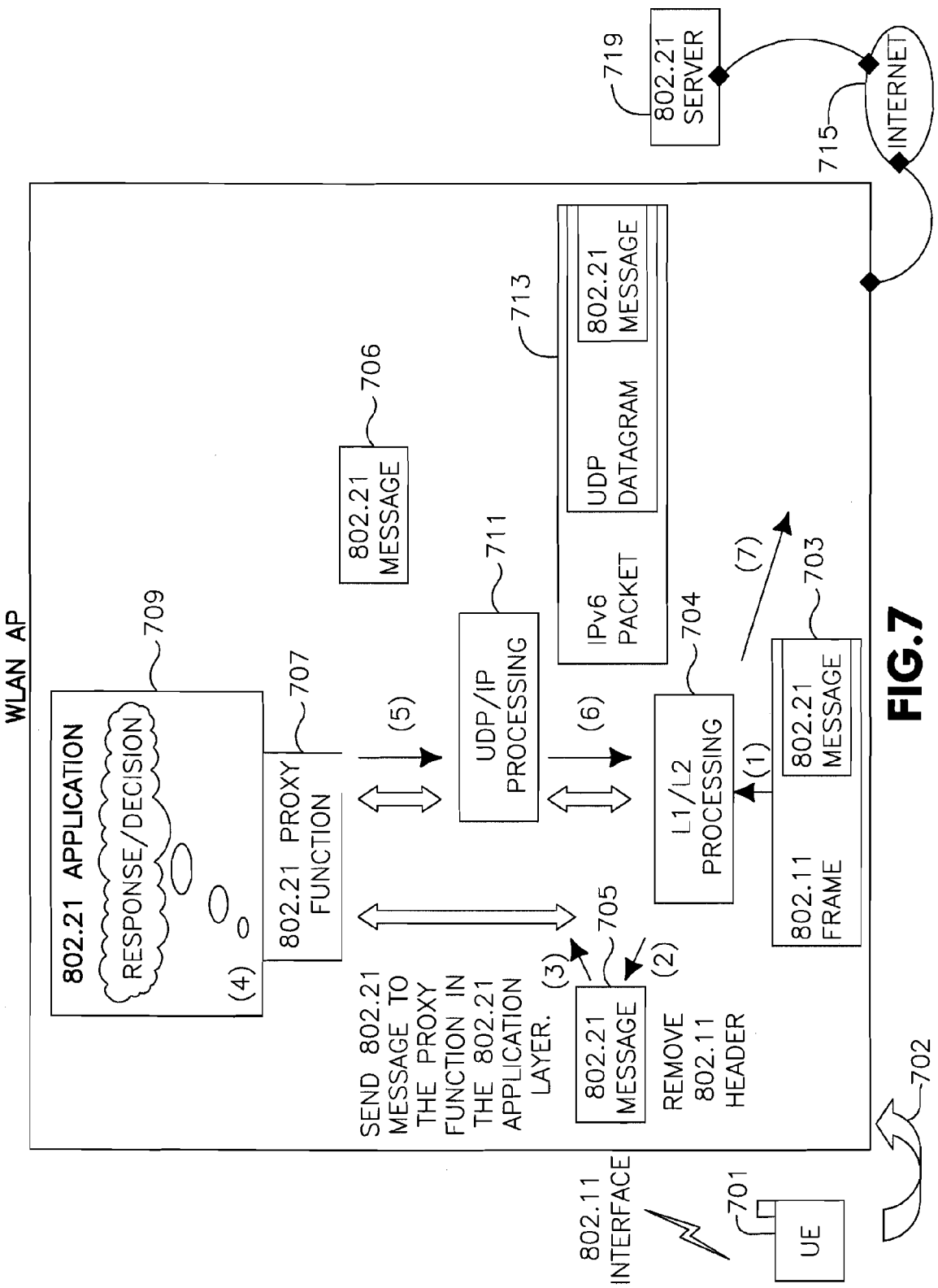
FIG. 7 is a flow diagram of a method of processing of an 802.11 message in a wireless local area network (WLAN) in accordance with an alternative embodiment of the present invention.

At step 664, the 802.21 application of the WTRU 601 sends an 802.21 event message to inform the 802.21 Server 603 about its completion of the handover process. In connection therewith, at step 666, the 802.21 application of the WTRU 601 sets its event timer and waits for an ACK message. At step 668, the 802.21 server 603 receives the message and decodes it. It then decides what should be done next. At step 670, the 802.21 Server 603 sends a timely ACK message to the WTRU 601 that arrives before the WTRU's event timer expires. At step 670 the VoIP session continues seamlessly over the UMTS link. Preferably, the VoIP session is not interrupted during the message exchange between the WTRU 601 and the 802.21 server 603.

Where a WLAN is 802.21 enabled, it may inter-network, or proxy, layer 2 (L2) messages that are transmitted from a WTRU to an 802.21 server. FIG. 7 is a flow diagram illustrating one aspect of the functionality of an 802.21 proxy entity of a WLAN in accordance with an embodiment of the present invention. At step 702, an 802.11 frame 703 containing an 802.21 message 705 from a WTRU 701 is received via an 802.11 interface using L2 signaling. At step 704, a physical layer (L1) in connection with layer L2 removes the 802.11 frame header in conventional L1/L2 processing. The encapsulated 802.21 message 705 is passed to the proxy function component 707 of the WLAN which recognizes the message 705 as an 802.21 message. The proxy function component 707 triggers, the 802.21 application 709 to which it then passes the message 705. The 802.21 application 709 then preferably determines the message type and decides about the next actions to be executed. Knowing the message type, the 802.21 application 709 associates an application timer with the message that is to be set when the message is redirected to the server 711.

The proxy function component 707 also recognizes that the message is to be redirected to a server 719 and passes the message 705 to a UDP/IP layer component 711 for encapsulation. The 802.21 message is encapsulated in a UDP datagram at step 706, which in turn is inserted into an IPv6 packet 713, such as is described in more detail above with respect to FIGS. 1-3. The IPv6 packet 713 is then sent to the lower layers for transmission into the IP network. The lower layers perform the necessary frame encapsulation of the IPv6 packet 713 and transmit the final data into the network 715, which in turn delivers the packet with the encapsulated 802.21 message 705 to the 802.21 server 719. In connection with sending the packet, the WLAN sets the timer allocated by the WLAN's 802.21 application 709 to trigger retransmission if the timeout period expires before the WLAN receives an ACK from the 802.21 server 719.

When the WLAN receives an 802.21 message in an IPv6 packet from the 802.21 server 719 that is to be directed to the WTRU, the WLAN component are configured to take the inverse action. Preferably, the UDP/IP layer component 711 is configured to extract the 802.21 message from the IP packet and the proxy function component 707 is configured to direct the repackaging of the 802.21 message into an 802.11 frame for L2 signaling to the WTRU 701. Additionally, the WLAN's 802.21 application 709 is preferably configured to generate an ACK in connection with the receipt of the 802.21 message from the 802.21 server 719.

Figure 8A:
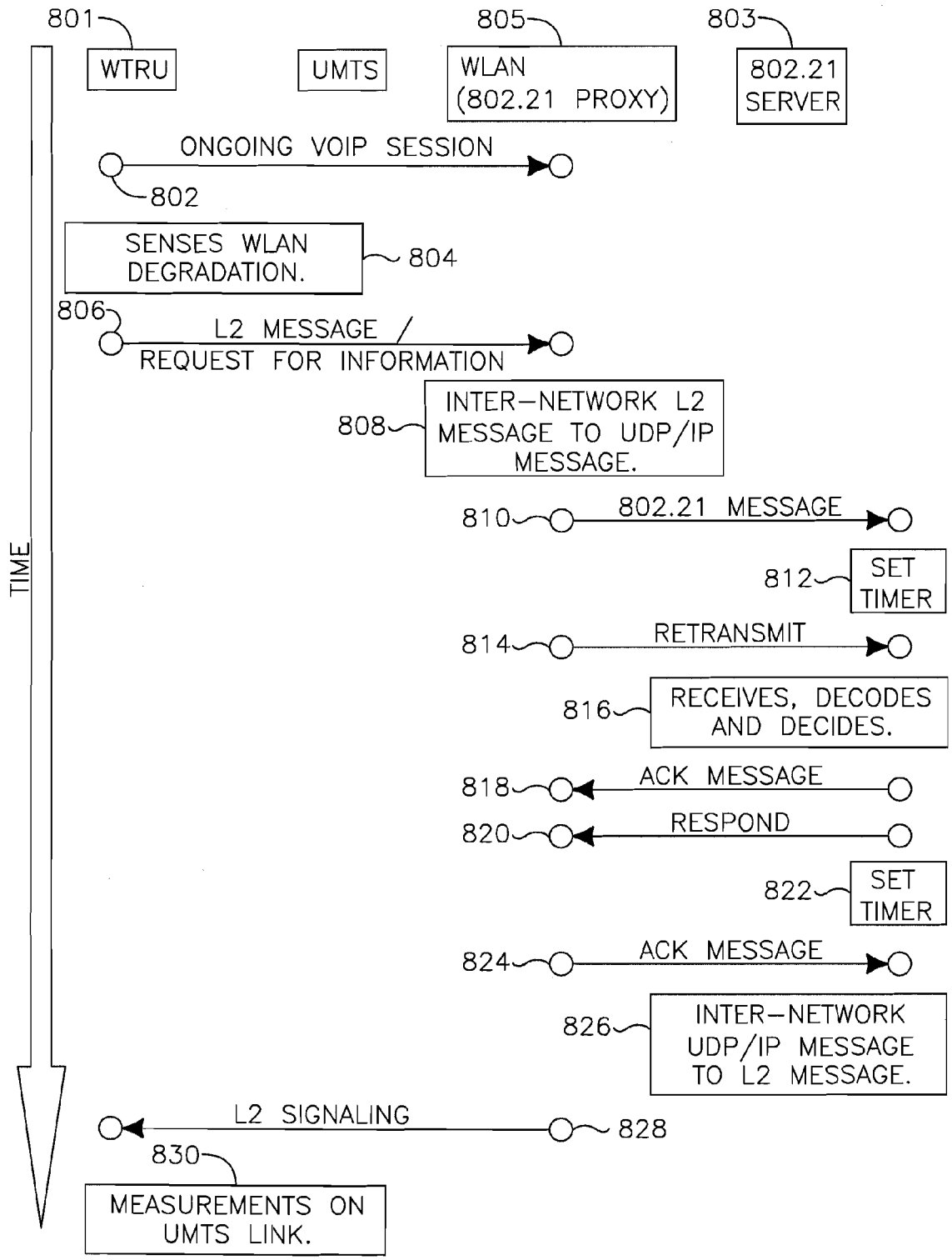
FIG. 8a is a signaling diagram for a method of signaling between a WTRU and a proxy in accordance with the alternative embodiment of the present invention.

FIG. 8a is a signaling diagram for a network controlled handover with an 802.21 enabled WLAN 805 acting as proxy between a WTRU 801 incorporating an 802.21 application and an 802.21 server 803 that all are equipped with timer devices in accordance with another embodiment of the present invention. When a message is received from either the 802.21 server 803 or the 802.21 application of the WTRU 801, the 802.21 proxy in the WLAN is triggered and takes the necessary actions. In this embodiment, the WLAN preferably processes a message upon receipt and does not simply route messages to their destinations. The same type of reliability mechanism for UDP/IP transport that was previously discussed is preferably used between the WLAN 805 and the 802.21 Server 803.

In the FIG. 8 example, at step 802, the WTRU 801 is connected via a WAN link to the WLAN 805 over which there is an ongoing VoIP session. At step 804, the 802.21 application of the WTRU 801, which preferably has an intelligent engine, detects degradation on the WLAN link. At step 806, the 802.21 application of the WTRU 801 sends an information message to the WLAN 805 containing a request for information of the list of neighboring operators for the UMTS link. Preferably, the WLAN 805 supports Layer 2 (L2) 802.21 functionality, so that the message is preferably sent as an L2 message. Since L2 messaging over the WLAN link is relatively reliable, the WTRU 801 preferably simply waits for a response from the WLAN 805 without being configured to expect an acknowledgement of the L2 messaging at the higher 802.21 application layer. Alternatively (not shown), the 802.21 application of the WTRU 801 may set a timer with an timeout period to permit the WLAN 805 time to acknowledge receipt of the message. Where such a timer is used for L2 messaging, the WTRU 801 and WLAN 805, are preferably configured to send acknowledgments and retransmit such L2 messages after an unacknowledged timeout period expires.

At step 808, the 802.21 entity of the WLAN 805 identifies the L2 message as an 802.21 information message and does the necessary steps to inter-network with the server 803 via UDP/IP, such as embedding the WTRU's 802.21 message in a IP data packet of the type shown in FIGS. 1-3. At step 810, the 802.21 entity of the WLAN 805 sends the 802.21 message to the 802.21 server 803. In connection therewith, at step 812, the 802.21 entity of the WLAN 805 sets its information timer, preferably with a timeout period of $\tau_1$ seconds.

In the example of FIG. 8a, an ACK does not arrive at the WLAN 805 within $\tau_1$ seconds. Therefore, at step 814, the 802.21 entity of the WLAN 805 retransmits the message to the 802.21 server 803 and resets its information timer. At step 816, the 802.21 server 803 receives the message, decodes it and decides about its next actions. At step 818, the server 803 sends an ACK message to the WLAN 805 which receives it before the information timer expires. At step 820, the 802.21 server 803 sends a response message to the WLAN 805 that is to be delivered to the WTRU 801. In connection therewith, at step 822, the 802.21 server 803 sets its information timer.

At step 824, the 802.21 entity of the WLAN 805 sends an ACK to acknowledge the receipt of the message that arrives at the 802.21 server 803 before its information timer expires. At step 826, the 802.21 entity of the WLAN 805 performs the necessary steps to inter-network the message into an L2 message for the WTRU 801. At step 82, the responsive L2 message is sent from the WLAN 805 to the WTRU 801 via L2 signaling. At step 830, the 802.21 application in the WTRU 801 receives the message, decodes it, and performs measurements on the UMTS link.

Figure 8B:
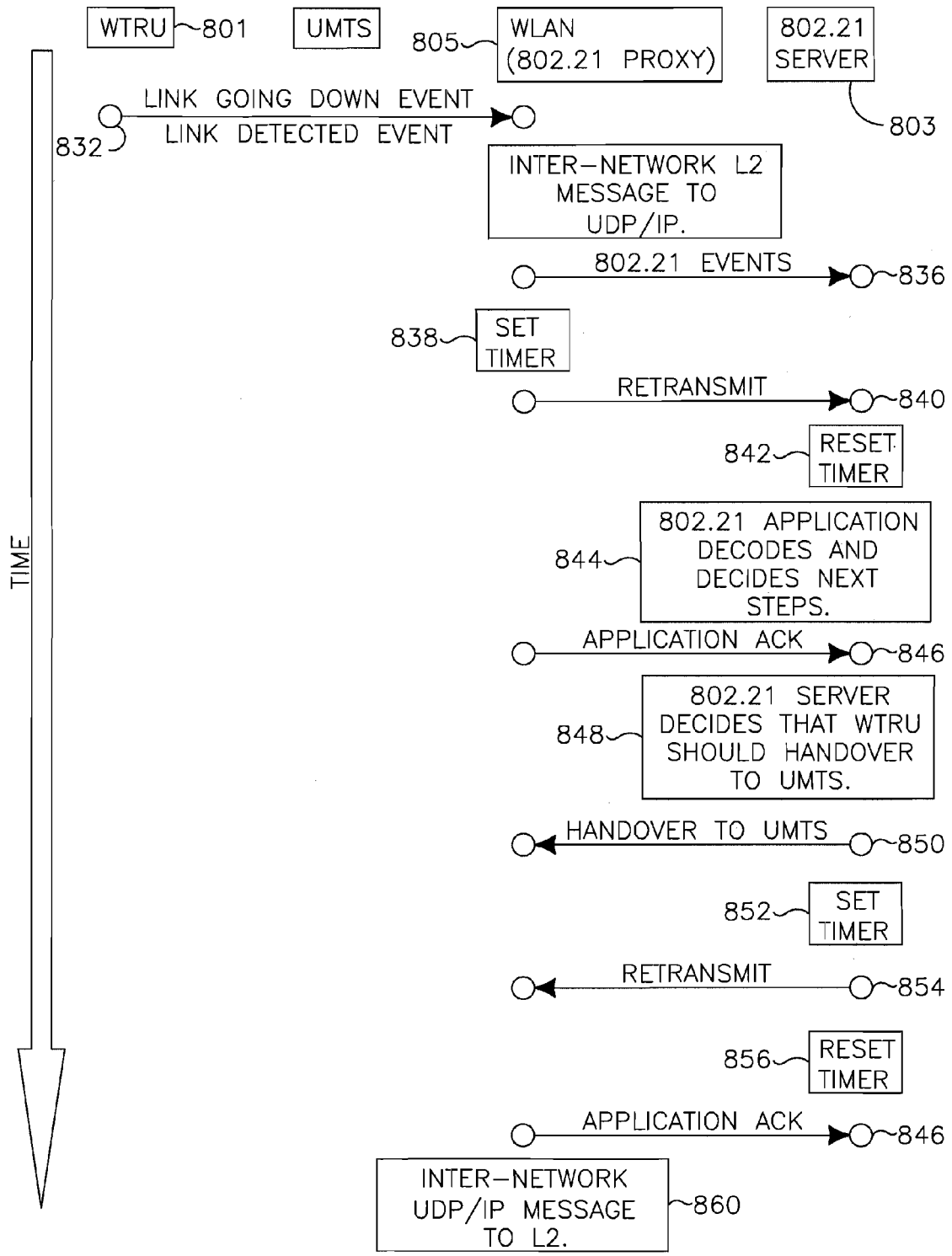

The example of FIG. 8a continues with reference to FIG. 8b, where, at step 832, the WTRU 801 sends an 802.21 WLAN "Link Going Down Event" and UMTS "Link Detected Event" to the WLAN 805 via L2 signaling. At step 834, the 802.21 proxy entity of the WLAN 805 is triggered and takes the necessary inter-networking actions, such as embedding the WTRU's 802.21 message in a IP data packet of the type shown in FIGS. 1-3. At step 836, the 802.21 proxy entity of the WLAN 805 forwards the "Event" to the 802.21 server 803, over UDP/IP. In connection therewith, at step 838, the 802.21 proxy entity of the WLAN 805 sets its event timer, preferably with a timeout period of $\tau_2$ seconds. In the example, an ACK does not arrive at the WLAN 805 within $\tau_2$ seconds. Therefore, at step 840, the 802.21 proxy entity of the WLAN 805 retransmits the message to the 802.21 server 803 and, at step 842, resets its event timer.

At step 844, the 802.21 server 803 receives the message, decodes it and determines its next action. At step 846, the 802.21 server 803 sends an ACK to the WLAN 805 to acknowledge receipt of the message. The ACK arrives at the WLAN 805 before the event timer expires. At step 848, the 802.21 server 803 performs internal actions and determines that the WTRU 801 should handover to a UMTS operator.

At step 850, the 802.21 server 803 sends an 802.21 "Handover to UMTS" command to WLAN 805 that is redirected to the WTRU 801. In connection therewith, at step 852, the 802.21 server 803 sets its command timer preferably with a timeout period of $\tau_3$ seconds. In the example, the ACK does not arrive at the 802.21 server 803 within $\tau_3$ seconds. Therefore, at step 854, the 802.21 server 803 retransmits the message to the WLAN 805 and in connection therewith, at step 856, resets its command timer. At step 858, the 802.21 proxy entity of the WLAN 805 sends an ACK to the server 803. The ACK arrives before server's command timer expires.

Figure 8C:
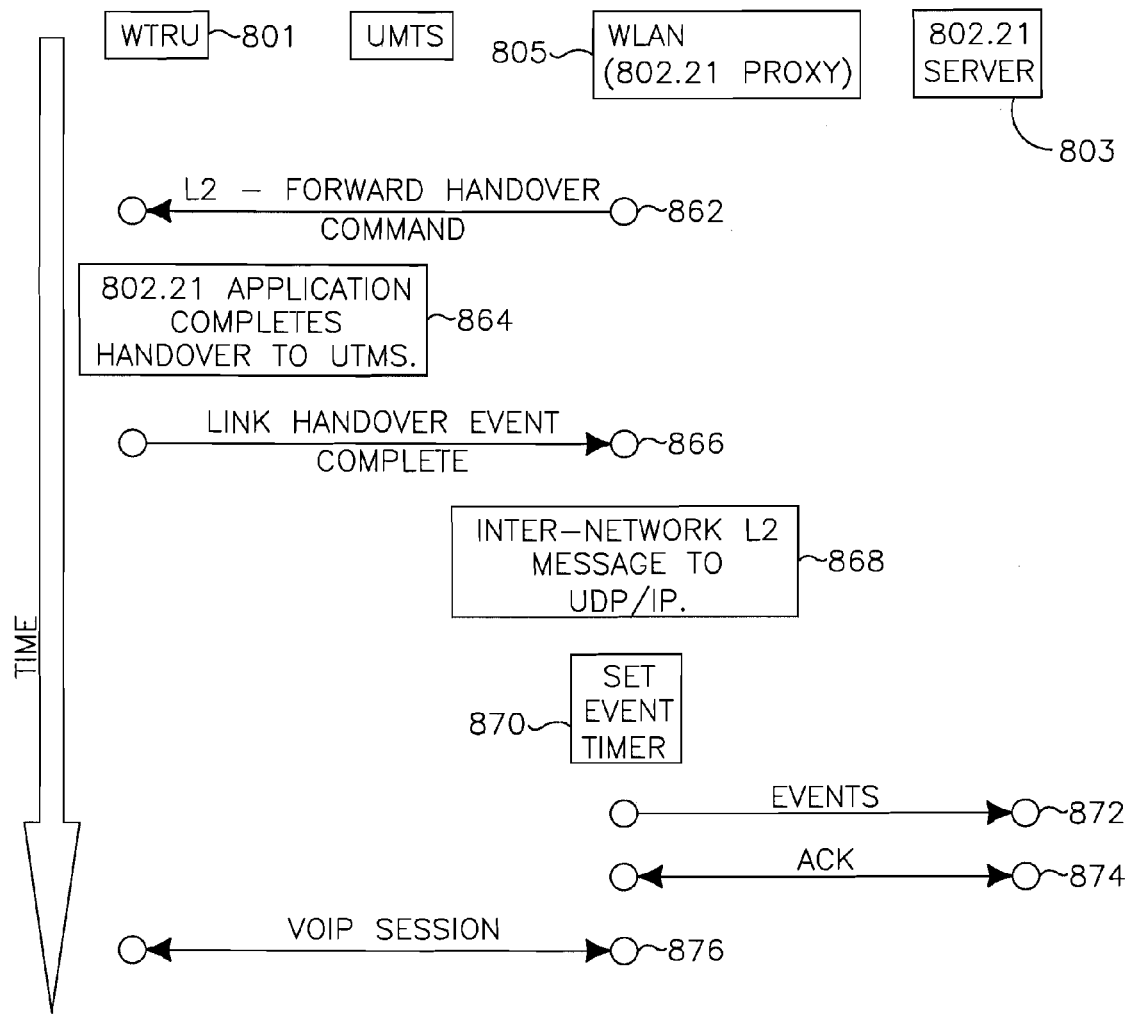
FIG. 8c is a continuation of the signaling diagram of FIG. 8b.

At step 860, the WLAN 805 inter-networks the command to the WTRU 801 via L2 signaling. Turning now to FIG. 8c, at step 862, the WLAN 805 forwards the handover command to the WTRU 801 via L2 signaling.

At step 864 the WTRU 801 takes the necessary handover actions and completes the handover process to a UMTS link. In connection therewith, at step 866, the WTRU 801 sends an 802.21 "Link Handover Complete" event via L2 signaling to the WLAN 805 whose 802.21 entity is triggered and decides on next actions. At step 868, the WLAN 805 inter-networks the event, such as embedding the WTRU's 802.21 event message in an IP data packet of the type shown in FIGS. 1-3. At step 872, the event message is forwarded by the 802.21 proxy entity of the WLAN 805 and in connection therewith, at step 870, the 802.21 proxy entity of the WLAN 805 sets its event timer. At step 874 the 802.21 server 803 sends an ACK message to the WLAN 805 which receives it before the event timer expires. At step 876, the VoIP session, which had been seamlessly switched from the WLAN link by the handover, continues over the UMTS link. Preferably, at no point in the process is the VoIP session interrupted during the message exchange between the WTRU 801 and the 802.21 server 803.

The methods disclosed above include reliability that is preferably implemented using timer devices that have different timeout periods corresponding to different 802.21 messages and ACK messages at the application layer. Each time a message is sent, the ACK Request bit in the 802.21 message frame is preferably set, indicating that the receiver should acknowledge receipt of the message. In such instances, a timer is used when sending all types of messages except for sending an ACK message to acknowledge receipt of a message.

Alternatively, each time a message is sent, an ACK Request bit may not be set. Instead, an ACK Request bit may be set as needed, so that the timer is only used when the ACK Request bit is set. For example, the ACK request bit may not be set for an information message that is sent periodically. In that case the timer would not be used. However, when sending, for example, 802.21 event and command messages, the ACK Request bit are preferably always set, and the timers used, because these messages are more sensitive.

In an alternative embodiment of the present invention, rather than using UDP as the transport mechanism, TCP may be used to transport certain 802.21 messages after the establishment of a TCP connection. For example, messages containing information can be lengthy and might not be encapsulated in one IP packet. TCP provides flow control by providing sequence numbers for every TCP segment. Thus the entire message can be broken into several segments, each of which gets encapsulated in a separate IP packet. At the receiver, the TCP layer reassembles the segment and presents the data to the upper layers as one piece. Some information messages can tolerate some delay that might be caused by the TCP connection establishment process.

In another alternative, IPv4 may be used instead of IPv6.

In another alternative, the 802.21 proxy function of the WLAN may not be restricted to a WLAN AP. It may reside in a WLAN access controller, for example.

The present invention may be implemented in any type of wireless communication system, as desired. By way of example, the present invention may be implemented in any type of 802 system, WCDMA, LTE or any other type of wireless communication system. The present invention may also be implemented on an integrated circuit, such as an application specific integrated circuit (ASIC), multiple integrated circuits, logical programmable gate array (LPGA), multiple LPGAs, discrete components, or a combination of integrated circuit(s), LPGA(s), and discrete component(s). The present invention may be implemented in software, middleware, in a radio resource manager (RRM), radio resource controller (RRC), and as a mobility solution.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A method for a communication device to perform media independent handover (MIH) comprising:
   generating a higher layer handover message;
   sending the higher layer handover message encapsulated in a lower layer formatted communication;
   setting a higher layer timing device for a timeout period in connection with the sending of the encapsulated higher layer handover message; and
   resending the higher layer handover message encapsulated in a lower layer formatted communication unless a higher layer acknowledgement is received before expiration of the timeout period.

2. The method of claim 1 performed by a wireless transmit receive unit (WTRU) wherein the encapsulated higher layer handover message is sent to a MIH server using User Datagram Protocol over Internet Protocol (UDP/IP) formatting for the lower layer formatted communication in connection with controlling a handover of a communication being conducted by the WTRU.

3. The method of claim 1 performed by a MIH server wherein the encapsulated higher layer handover message is sent to a wireless transmit receive unit (WTRU) using User Datagram Protocol over Internet Protocol (UDP/IP) formatting for the lower layer formatted communication in connection with controlling a handover of a communication being conducted by the WTRU.

4. The method of claim 1 wherein the higher layer handover message is generated by a component compliant with IEEE 802.21 standards.

5. The method of claim 1 further comprising:
generating a second higher layer handover message of a different type;
sending the second higher layer handover message encapsulated in a lower layer formatted communication;
setting a higher layer timing device for a second timeout period determined based upon the type of message in connection with the sending of the encapsulated second higher layer handover message; and
resending the second higher layer handover message encapsulated in a lower layer formatted communication unless a higher layer acknowledgement is received before expiration of the second timeout period.

6. The method of claim 5 performed by a wireless transmit receive unit (WTRU) wherein the encapsulated higher layer handover messages are sent to a MIH server using User Datagram Protocol over Internet Protocol (UDP/IP) formatting for the lower layer formatted communication in connection with controlling a handover of a communication being conducted by the WTRU.

7. The method of claim 5 performed by a MIH server wherein the encapsulated higher layer handover messages are sent to a wireless transmit receive unit (WTRU) using User Datagram Protocol over Internet Protocol (UDP/IP) formatting for the lower layer formatted communication in connection with controlling a handover of a communication being conducted by the WTRU.

8. The method of claim 1 wherein the higher layer handover messages are generated by a component compliant with IEEE 802.21 standards.

9. The method of claim 1 wherein the higher layer timing device is an information timer.

10. The method of claim 1 wherein the higher layer timing device is an event timer.

11. The method of claim 1 wherein the higher layer timing device is a command timer.

12. The method of claim 1 wherein the handover message is one of an event type, a command type or an information type.

13. A method for a communication device to perform media independent handover (MIH) comprising:
generating a higher layer handover message;
sending the higher layer handover message encapsulated in a lower layer formatted communication;
setting a higher layer timing device for a timeout period in connection with the sending of the encapsulated higher layer handover message; and
resending the higher layer handover message encapsulated in a lower layer formatted communication unless a higher layer acknowledgement is received before expiration of the timeout period;
generating a second higher layer handover message of a different type;
sending the second higher layer handover message encapsulated in a lower layer formatted communication;
setting a higher layer timing device for a second timeout period determined based upon the type of message in connection with the sending of the encapsulated second higher layer handover message; and
resending the second higher layer handover message encapsulated in a lower layer formatted communication unless a higher layer acknowledgement is received before expiration of the second timeout period.

14. A communication device configured to facilitate media independent handover (MIH) comprising:
a higher layer component configured to generate a higher layer handover message;
lower layer components configured to send the higher layer handover message encapsulated in a lower layer formatted communication;
the higher layer component configured to set a higher layer timing device for a timeout period in connection with the sending of the encapsulated higher layer handover message; and
the higher layer component configured to control the lower layer components to resend the higher layer handover message encapsulated in a lower layer formatted communication unless a higher layer acknowledgement is received before expiration of the timeout period.

15. The communication device of claim 14 configured as a wireless transmit receive unit (WTRU) having lower layer components configured to encapsulate and send the higher layer handover message to a MIH server using User Datagram Protocol over Internet Protocol (UDP/IP) formatting for the lower layer formatted communication in connection with controlling a handover of a communication being conducted by the WTRU.

16. The communication device of claim 14 configured as a MIH server having lower layer components configured to encapsulate and send the higher layer handover message to a wireless transmit receive unit (WTRU) using User Datagram Protocol over Internet Protocol (UDP/IP) formatting for the lower layer formatted communication in connection with controlling a handover of a communication being conducted by the WTRU.

17. The communication device of claim 14 wherein the higher layer component is compliant with IEEE 802.21 standards.

18. The communication device of claim 14 wherein:
the higher layer component is configured to generate a second higher layer handover message of a different type;
the lower layer components are configured to send the second higher layer handover message encapsulated in a lower layer formatted communication;
the higher layer component is configured to set the higher layer timing device for a second timeout period determined based upon the type of message in connection with the sending of the encapsulated second higher layer handover message; and
the higher layer component is configured to control the lower layer components to resend the second higher layer handover message encapsulated in a lower layer formatted communication unless a higher layer acknowledgement is received before expiration of the second timeout period.

19. The communication device of claim 18 configured as a wireless transmit receive unit (WTRU) having lower layer components configured to encapsulate and send the higher layer handover messages to a MIH server using User Datagram Protocol over Internet Protocol (UDP/IP) formatting for the lower layer formatted communication in connection with controlling a handover of a communication being conducted by the WTRU.

20. The communication device of claim 18 configured as a MIH server having lower layer components configured to encapsulate and send the higher layer handover messages to a wireless transmit receive unit (WTRU) using User Datagram Protocol over Internet Protocol (UDP/IP) formatting for the lower layer formatted communication in connection with controlling a handover of a communication being conducted by the WTRU.

21. The communication device of claim 18 wherein the higher layer component is compliant with IEEE 802.21 standards.

22. A communication device configured to facilitate media independent handover (MIH) comprising:
   a higher layer component configured to generate a higher layer handover message;
   lower layer components configured to send the higher layer handover message encapsulated in a lower layer formatted communication;
   said higher layer component configured to set a higher layer timing device for a timeout period in connection with the sending of the encapsulated higher layer handover message; and
   the higher layer component configured to control the lower layer components to resend the higher layer handover message encapsulated in a lower layer formatted communication unless a higher layer acknowledgement is received before expiration of the timeout period;
   the higher layer component is configured to generate a second higher layer handover message of a different type;
   the lower layer components are configured to send the second higher layer handover message encapsulated in a lower layer formatted communication;
   the higher layer component is configured to set the higher layer timing device for a second timeout period determined based upon the type of message in connection with the sending of the encapsulated second higher layer handover message; and
   the higher layer component is configured to control the lower layer components to resend the second higher layer handover message encapsulated in a lower layer formatted communication unless a higher layer acknowledgement is received before expiration of the second timeout period.

* * * * *